Dec. 25, 1962  F. J. CALLAHAN ET AL  3,070,117
METERING VALVE

Filed Feb. 23, 1960  2 Sheets-Sheet 1

INVENTORS
FRANCIS J. CALLAHAN, JR.
BERNARD J. GALLAGHER
BY
Fay & Fay
ATTORNEYS

Dec. 25, 1962     F. J. CALLAHAN ET AL     3,070,117
METERING VALVE

Filed Feb. 23, 1960     2 Sheets-Sheet 2

INVENTORS
FRANCIS J. CALLAHAN, JR.
& BERNARD J. GALLAGHER
BY
*Fay & Fay*
ATTORNEYS

United States Patent Office 3,070,117
Patented Dec. 25, 1962

3,070,117
METERING VALVE
Francis J. Callahan, Chagrin Falls, and Bernard J. Gallagher, Cleveland Heights, Ohio, assignors to Nuclear Products Company, Cleveland, Ohio, a corporation of Ohio
Filed Feb. 23, 1960, Ser. No. 10,389
11 Claims. (Cl. 137—360)

This invention relates to valves of the type particularly useful in metering applications where extremely fine flow control is desired.

The Problem

A considerable amount of attention has been given in the trade during recent years towards the development of a metering valve which should provide satisfactory functional results, while at the same time being sufficiently practical from the standpoint of production, maintenance and installation costs to be commercially feasible. As expected, a large number of designs for such a valve have been proposed. While these proposed designs represent considerable progress, there remains ample opportunity for improvement in certain specific areas.

There are, of course, a number of structural prerequisites which must be embodied in a valve of the type described if the desired ends with regards to function and costs are to be met. Inasmuch as valves of the kind described are used generally in applications in which extreme accuracy with regards to metered fluid is required, extremely fine flow control is an indispensable characteristic of an acceptable valve.

Very low dead space or internal volume in such metering valves has been strongly desired for use in instrument and analysis work. If the internal volume is kept low, the need for long purging of the valve to remove unwanted gas or liquid samples is eliminated. No previous design has been able to incorporate such a small dead space as is achieved in this valve by sealing close to the seat with an O ring or other sealing member, and by using tube connector ends.

In the quest for proper flow control characteristics, however, the aditional characteristic of structural simplicity must not be overlooked, for it is well known that over-sophistication breeds unreliability, and reliability is another indispensable attribute of a satisfactory metering valve. In instances where simplicity and reliability are attained, optimization of maintenance costs usually follows, since fewer opportunities for failures are presented.

A further aspect to be considered is that of installation. Usually, metering valves are mounted on bulkheads or panels. It is, therefore, necessary that an acceptable valve be so constructed as to lend itself to rapid and as nearly effortless installation as possible.

The Solution

This invention proposes a practical solution to the problem within the framework of the considerations discussed hereinabove.

It is a general object of this invention to provide a metering valve which is simple both in structure and in operation and which is characterized by its ease of maintenance and installation and its low cost of production.

It is a further object of this invention to provide a metering valve featuring extremely fine flow control through its full range of operation.

It is a more particular object of this invention to provide a valve of the type described which provides for fine flow control characteristics through the use of a generally conical needle point which seats against the orifice of the valve.

An even further object of this invention is to provide a valve of the type described, which is provided with means to prevent dust and other foreign material from gaining access to the interior of the valve.

Another object of this invention is to provide a valve of the type described and characterized by the utilization of stop means to prevent over-advancement of the needle point into the orifice.

Another object of the invention is to provide a valve of the type described which is so constructed as to reduce the dead space or internal volume of the valve to a minimum value.

Still another object of this invention is to provide a valve device which may be mounted on a bulkhead or the like without the necessity of first disassembling the valve.

Other and further objects of the invention will be apparent from the detailed description to follow.

Within the contemplation of this invention is a metering valve employing a central stem having a generally conical needle point thereon for co-operation with an orifice provided in the valve body. By so proportioning the various components of the valve that the orifice seats against the needle point intermediate the ends of the point when the valve is closed, it has been found that greatly improved flow control may be obtained.

The stem and the bonnet portion of the valve housing are interengaged by means of threads having the pitch thereof so selected as to provide a micrometer-like control for the advancement and retraction of the stem. This arrangement also contributes towards the attainment of extremely favorable flow control characteristics.

By means of a sealing ring which is disposed around the stem of the valve adjacent one end of the threads and by means of a specially constructed cap enveloping the stem and the bonnet adjacent the other end of the threads, foreign matter is prevented from entering the interior of the valve, particularly that portion thereof located in the neighborhood of the threads. In this manner, efficient and accurate operation of the valve is ensured. The positioning of the sealing ring near the orifice contributes markedly to the reduction of dead space or internal volume present in a valve constructed in accordance with the teachings of the invention.

To ensure additional reliability of operation, in some instances, the portion of the valve housing forming the orifice and the portion of the stem forming the needle point are constructed with diverse hardnesses to prevent scoring, which might otherwise interfere with the efficient operation of the valve.

With a view towards the optimization of installation costs, the dust-proof operating cap is so dimensioned with respect to the portion of the bonnet adapted to be attached to the panel or bulkhead as to allow insertion through the bulkhead mounting aperture from the rear of the bulkhead. In this manner, a valve embodying this principle of the invention may be mounted on a bulkhead or panel without the necessity of first disassembling the valve.

Description

Figure 1:
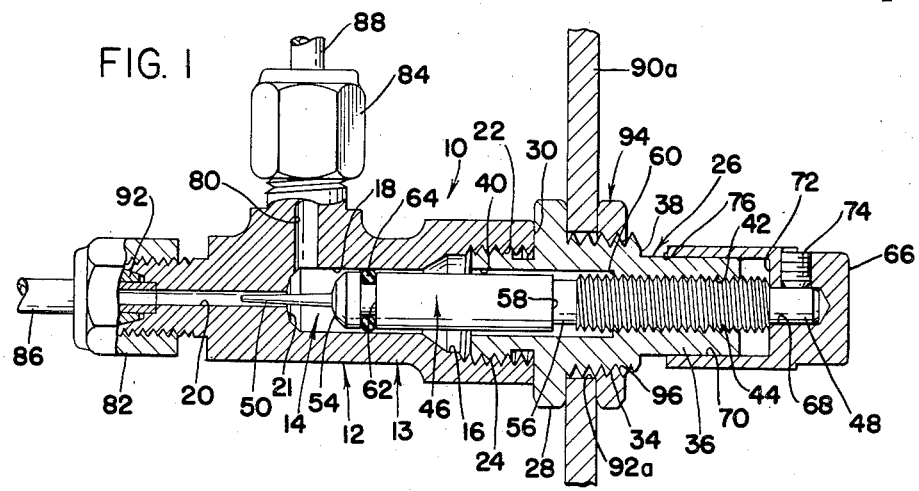
FIG. 1 is a side elevation partly in longitudinal section of a valve embodying the principles of the invention and showing the stem partially retracted in order to allow fluid flow through the valve.

Referring now more particularly to the drawings, we have shown a valve 10 which includes an elongated housing indicated generally at 12 and constructed from a body member 13 and a bonnet member 26. The body member 13 is provided with a bore generally indicated at 14, which is divided into co-axially aligned sections 16, 18 and 20. As will be observed, the section 18 is reduced in diameter with respect to the section 16, so as to impart to the bore 14 a stepped configuration.

Figure 4:
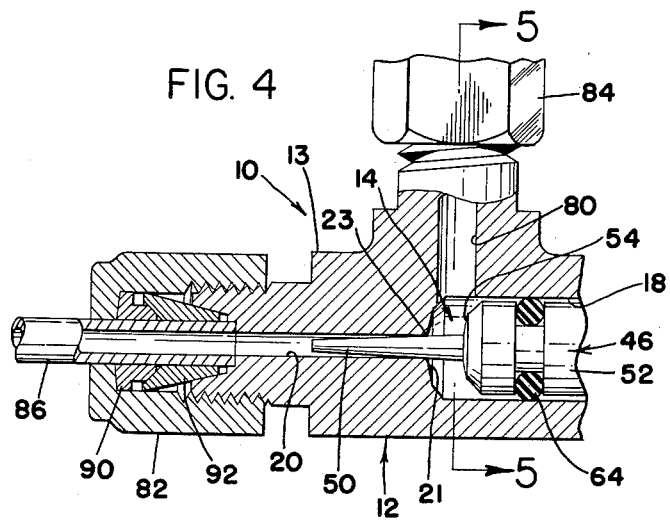
FIG. 4 is an enlarged side elevation, partly in longitudinal section showing the manner of seating between the needle point of the stem and the orifice.
Figure 5:
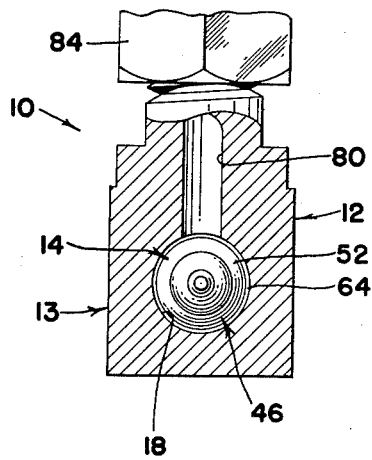
FIG. 5 is a view partly in cross section and taken along line 5—5 of FIG. 4.

The section 18 is joined to the section 20 of the bore 14 by means of a generally radially extending shoulder 21, and, as will be observed in FIG. 4 of the drawings, for example, the juncture of the section 20 with the shoulder 21 forms an annular lip 23.

The mouth of the section 16 of the bore 14 is provided with screw threads 22 or other suitable connecting means for removable engagement with similar means 24 provided on one end of a bonnet member indicated generally at 26.

As illustrated, the bonnet member 26 is generally cylindrical in form and is provided intermediate its ends with a radially extending flange 28 which is adapted to abut the end face 30 of the body member 13 when the screw threads 22 and 24 are fully engaged. Tool pads 32 or other suitable wrench engaging means may be provided along the external periphery of the flange 28, if desired, to facilitate the assembly of the bonnet 26 into the body 13. The bonnet member 26 is provided with a second set of threads 34 or other suitable connecting means located adjacent the flange 28 on the side thereof opposite the screw threads 24. These threads 34 have been illustrated as being somewhat larger in diameter than the threads 24, but it will be realized, of course, that this relationship need not necessarily exist.

Figure 2:
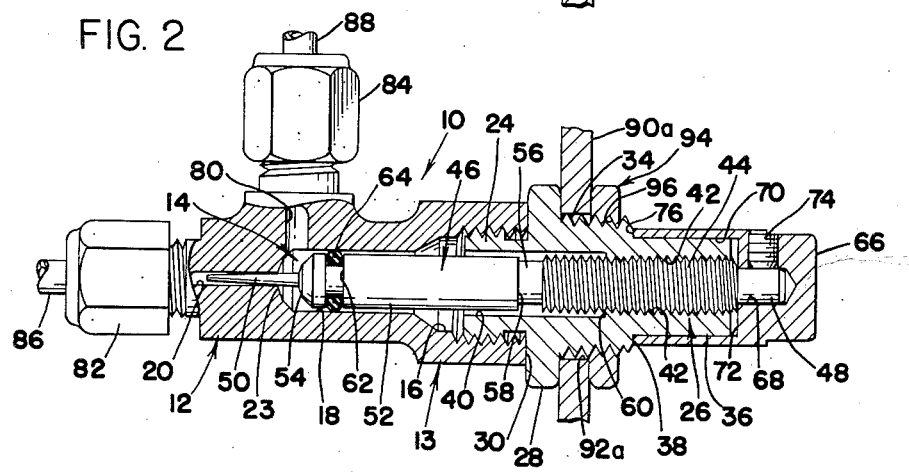
FIG. 2 is a side elevation partly in longitudinal section of the valve of FIG. 1 showing the stem in advanced position and the needle point seated within the orifice to prevent fluid flow through the valve.
Figure 3:
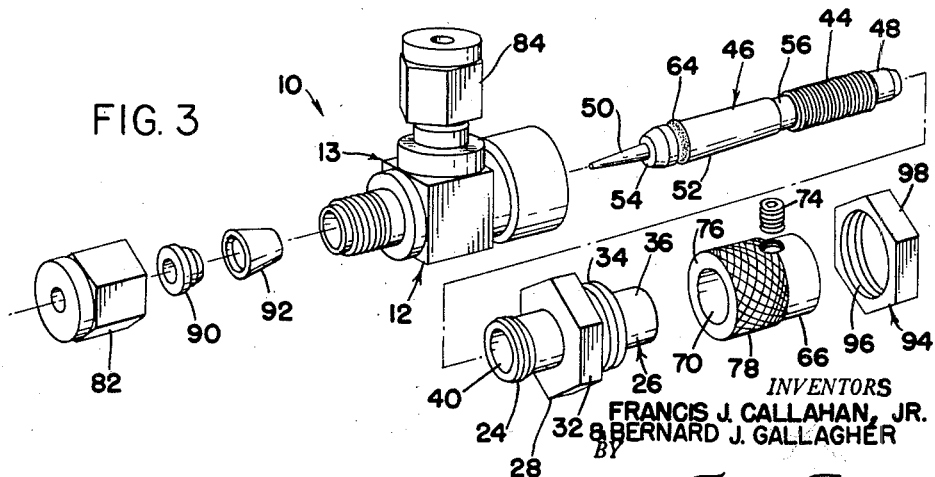
FIG. 3 is an exploded perspective view of a valve constructed in accordance with the principles of the invention.

The outer end portion 36 of the bonnet is provided with a generally cylindrical external configuration and is somewhat reduced in diameter with respect to the second threaded area 34 so as to produce a radial stop shoulder 38. A longitudinally directed bore 40, as seen in FIG. 2, extends through the bonnet member 26. Relatively fine internal thread means 42 are provided in the bore for co-operation with similar relatively fine thread means 44 provided on the stem generally indicated at 46. As seen in FIGS. 1 and 2 of the drawings, the bore 40 in the bonnet member 26 is substantially co-axially aligned with the bore 14 in the body 13 when the threads 22 and 24 are engaged.

The stem 46 is of elongated, generally cylindrical form and of a size to be slidably received within bore 40 provided in the bonnet member 26 and section 18 of the bore 14 provided in the body 13. The stem 46 is provided at its outer end with a smooth unthreaded portion 48 which may, if desired, be of somewhat reduced diameter with respect to the diameter of the threads 44. Stem 46 is provided at its inner end with a generally conical needle point 50 joined to the central portion 52 of the stem by means of a transversely extending shoulder 54. The generally conical needle point 50 diverges in a direction towards the bonnet member 26 and at its free end is somewhat smaller in diameter than the section 20 of the bore 14, while at the end thereof adjacent the shoulder 54, somewhat larger.

The central portion 52 of the stem 46 is about the same in diameter as the crests of the threads 44, but is separated therefrom by means of a reduced diameter unthreaded portion 56. The reduction in diameter of the stem 46 and 56 provides a radial stop shoulder 58 which limits the withdrawal of the stem through the abutment of the shoulder 58 with the shoulder 60, adjacent the inner end of the threads 44.

A circumferentially extending groove 62 formed in the central portion 52 of the stem adjacent the shoulder 54 and near the lip 23 when the valve is assembled, receives an annular sealing element 64 which is illustrated in the drawings as being of the O ring variety. Cap 66 is provided with a pair of co-axial counter bores 68 and 70 joined by means of a radially extending shoulder 72.

The counter bore 68 is of a size to slidably receive the smooth outer end portion 48 of the stem 46 and is detachably affixed thereto by means of set screw 74 or other suitable means. Counter bore 70 is of a size to slidably receive the smooth outer end portion 36 of the bonnet 26 and is of a length to abut between the inner end face 76 thereof and the stop shoulder 38 of the bonnet, as seen in FIG. 2, thereby to limit the degree to which the needle point 50 may be advanced into the section 20 of the bore 15. Suitable knurling means 78 or the like may be provided on the cap 66, if desired, in order to increase the ease with which the same may be rotated by the operator.

A fluid outlet passageway 80 is provided in the body 13 and intersects the section 18 of the fluid passageway 14. Obviously, the section 20 of the bore 14 acts as a fluid inlet passageway. Suitable coupling means 82 and 84 may be provided on the body 13 for establishing fluid communication between the section 20 of the bore 14 and the fluid outlet passageway 80 and fluid lines 86 and 88 respectively. Coupling means 82 and 84 have been illustrated in the drawings as the compression type, including inwardly swageable ferrules 90 and 92, although this obviously need not be the case.

In applications where the metering valve 10 is to be mounted on a bulkhead or panel 90a provided with an aperture 92a extending therethrough, a nut 94 is provided which is internally threaded at 96 for co-operation with the threads 34 on the bonnet member 26. In this manner, the bulkhead 90a may be tightly clamped between the radial flange 28 on the bonnet and the internally threaded nut 94. Suitable tool pads, or other wrenching engaging means 98, may, if desired, be provided on the nut 94 in order to facilitate the ease with which the threads 96 may be threadedly engaged with the threads 34.

It will be observed from an examination of the drawings that the diameter of the externally threaded portion 34 of the bonnet member 26 is slightly larger than the greatest diameter of cap 66 and, of course, slightly smaller than the diameter of the aperture 92a. This allows the valve to be mounted on the bulkhead 90a without the removal of the cap, inasmuch as the cap will easily pass through the aperture 92a in the bulkhead as well as the aperture in the nut 94.

In a typical embodiment of the invention the threads 42 and 44 would be on the order of 40 pitch to impart a micrometer-like control to the extending and retracting movements of the stem 46 through the operation of the cap 66. The diameter of the section 20 of the bore would be about 0.055 inch and the length of this section would be from about 0.325 to 0.340 inch. The taper on the needle point 50 would be formed on included angle of about 3°.

In order to prevent repeated seatings from scoring the needle point and interfering with efficient operation of the needle 50 within the section 20 of the bore 14, it has been found extremely desirable to construct the stem 46 from a harder material than the body 13. In a typical embodiment the body would be made from brass or the like, while the stem would be constructed from stainless steel. Of course, similar materials could be used for both the stem and the body and the needle point 50 could be case hardened or the like.

It will be realized, of course, that the various dimensions and materials set forth hereinabove are given by way of illustration only and are not meant to be restrictive.

*Operation*

In operation a valve embodying the principles of this invention is reliable and efficient. As seen in FIG. 2, the stem 46, when the valve is closed, is extended so as to establish a substantially line contact or seating engagement between the needle point 50, intermediate its ends, and the annular lip 23. The section 20 is thereby sealed off from the interior of the valve and fluid flow from the line 86 to the line 88 is prevented Through counter-clockwise rotation of the cap 66, however, the stem 46 may be retracted, as seen, for example, in FIG. 1, thereby to break the sealing engagement between the needle point 50 and the annular lip 23 thereby to allow fluid flow through the section 20 and between lip 23 and the needle point 50 into the section 18 of the bore 14. From the section 18 the fluid is conducted through the passageway 80 and subsequently into the line 88. Clockwise rotation of the cap 66 will again cause the needle point 50 to be moved into seating engagement with the annular lip 23 to prevent further fluid flow through the valve. Hence, the annular lip serves as an orifice, while the needle acts as a means to control or meter the flow of fluids through the orifice.

It will be observed that the shoulder 21 interconnecting the sections 18 and 20 of the fluid passageway 14 and the shoulder 54 interconnecting the needle point 50 and the central section 52 of the stem 46 are both generally conical and diverge towards the bonnet member 26 This arrangement contributes towards a smooth flow of fluid from the section 20 to the outlet passageway 80 via the section 18 of the bore 14.

The sealing member 64 establishes a leak proof relationship between the stem 46 and the section 18 of the bore 14 and thereby prevents fluid from gaining access to the section 16 of the bore 14 and the threads 42 and 44. Because of the fact that the cap 66 envelops the cylindrical outer portion 36 of the bonnet 26, foreign matter such as dust particles and the like are prevented from gaining entry from the exterior of the valve to the threads 42 and 44. Therefore, these threads are isolated by means of the seal 64 and the cap 66 from the influences of corrosive fluids or foreign matter and the safe and reliable operation of the valve is thereby insured with accuracy being maintained at all times, and maintenance requirements being reduced to a minimum.

The abutment of the end face 76 of the cap with the radial stop shoulder 38, when the valve is in closed position, prevents over-tightening or over-extension of the needle point 50 into the section 20 of the bore 14 thereby to guard against damage either to the needle point or to the annular lip 23. Because of the fact that the annular lip 23 initially seats against the needle point intermediate the ends thereof, there is sufficient allowance for ordinary wear of the lip and the needle point. As the diameter of the lip becomes enlarged and the diameter of the needle point becomes reduced, the needle point need merely be extended a greater distance into the section 20 to allow seating to be established on a line nearer the shoulder 54. In some instances, of course, it will be necessary to adjust the position of the cap 66 on the smooth portion 48 of the stem in order to prevent abutment by the end face 76 and the radial stop shoulder 38 before the seating of the needle point 50 against the annular lip 23 has occurred.

Experimentation has shown that a valve constructed in accordance with this invention allows extremely accurate control of fluid flow. It must be remembered, however, that in order to obtain this control it is necessary that care be taken in the construction of the various parts of the valve in order to provide satisfactory accuracy with respect to such matters as the machining of the needle point 50 and section 20 of the bore 14 in order that desirable finish and alignment of these components may be provided The installation of a valve point according to the principles of this invention is greatly facilitated, and at the same time may be mounted on a bulkhead or panel without the necessity of disassembling the valve. This result is obtained by so proportioning the external diameters of the cap 66 and the threads 34 as to allow the clamping at 94 to be passed over the cap and subsequently engaged with the threads 34.

For purposes of illustration, certain terminology and certain concrete embodiments have been employed in the description of the inventive principles here involved. It will be immediately obvious, however, to one possessing but ordinary skill in the art that a number of departures could be made with respect to the terminology and illustrative embodiments employed without, at the same time, departing from the true scope of the invention. It is not our intention, therefore, to be limited by the specific illustrative embodiments shown or the descriptive terminology employed, but only by the scope of the appended claims.

We claim:

1. In a valve device of the type comprising a housing having a metering orifice therein in fluid conducting communications with fluid inlet means, fluid outlet means in fluid conducting communication with the metering orifice, an elongated stem positioned in the housing and having a substantially conical needle thereon for regulating fluid flow through the orifice, a conical surface means joining said stem and said needle, thread means on the stem intermediate its ends and engaged with the housing, and an end portion of the stem projecting from the housing and adapted for rotation to move the needle axially into and out of fluid sealing engagement with the orifice, the improvement which includes a generally cylindrical surface at one end of the housing and surrounding the point of emergence of the end portion of the stem from the housing, an operating cap mounted on the end portion of the stem and having a counterbore therein within which the said cylindrical portion of the housing is snugly received, a sealing member surrounding the stem between the thread means thereon and the fluid outlet means and establishing a leak proof relationship between the housing and the stem thereby, in co-operation with the cap, to prevent fluid and foreign matter from interfering with the efficient operation of the thread means, said needle and the portion of the housing forming the boundary of said orifice being of diverse hardnesses.

2. Structure as defined in claim 1 characterized by the provision of stop shoulder means in co-operation with the cylindrical portion and adapted for abutment with the edge of that portion of the cap within which the cylindrical portion is received, whereby to limit the travel of the stem and prevent over-tightening of the thread means and resultant scoring of the needle.

3. Structure as defined in claim 1 characterized by the provision of stop shoulder means in co-operation with the cylindrical portion and adapted for abutment with the edge of that portion of the cap within which the cylindrical portion is received, whereby to limit the travel of the stem and prevent overtightening of the thread means and resultant scoring of the needle, and further characterized by the provision of means for adjusting the position of the cap axially along the stem so that the travel thereof may be varied in order to compensate for wear on the needle.

4. Structure as defined in claim 1 characterized in that the sealing ring is positioned closely adjacent the orifice in order to reduce the dead space value of the valve, and provide a braking means for said stem.

5. A valve device of the type comprising a housing having a metering orifice therein in fluid conducting communication with fluid inlet means, fluid outlet means in fluid conducting communication with the metering orifice, an elongated stem positioned in the housing and having a slender elongated substantially conical needle thereon for regulating fluid flow through the orifice, conical surface means joining said stem and said needle, first thread means on the stem intermediate its ends and engaged with the housing, and an end portion of the stem projecting from the housing and adapted for rotation to move the needle axially into and out of fluid sealing engagement with the orifice, a generally cylindrical surface at one end of the housing and surrounding the point of emergence of the end portion of the stem from the housing, an operating cap mounted on the end portion of the stem and having a counterbore therein within which the said cylindrical portion of the housing is snugly received, a sealing member surrounding the stem between the first thread means thereon and the fluid outlet means and establishing a leak proof relationship between the housing and the stem thereby, in co-operation with the cap, to prevent fluid and foreign matter from interfering with the efficient operation of the thread means, second thread means provided on the exterior of the housing adjacent the said cylindrical portion and adapted for mounting the housing within an aperture in a bulkhead, and the largest dimension of the cap, taken in a plane perpendicular to the axis thereof, being smaller in magnitude than the crest diameter of the second thread means in order to permit the housing to be mounted within the bulkhead aperture without removing the cap.

6. In a valve device of the type comprising a housing having a metering orifice therein in fluid conducting communication with fluid inlet means, fluid outlet means in fluid conducting communication with the metering orifice, an elongated stem positioned in the housing and having a substantially conical needle thereon for regulating fluid flow through the orifice, thread means on the stem intermediate its ends and engaged with the housing, and an end portion of the stem projecting from the housing and adapted for rotation to move the needle axially into and out of fluid sealing engagement with the orifice, the improvement which includes a generally cylindrical surface at one end of the housing and surrounding the point of emergence of the end portion of the stem from the housing, an impervious operating cap mounted on the end portion of the stem and having a counterbore therein within which the said cylindrical portion of the housing is snugly received, a sealing member surrounding the stem between the thread means thereon and the fluid outlet means closely adjacent the latter and establishing a leak proof relationship between the housing and the stem thereby, in cooperation with the cap, to prevent fluid and foreign matter from interfering with the efficient operation of the thread means, and stop shoulder means in cooperation with the cylindrical portion and adapted for abutment with the edge of that portion of the cap within which the cylindrical portion is received, thereby to limit the travel of the stem and prevent over-tightening of the thread means and resultant scoring of the needle.

7. In a valve device of the type comprising a housing having a metering orifice therein in fluid conducting communication with fluid inlet means, fluid outlet means in fluid conducting communication with the metering orifice, an elongated stem positioned in the housing and having a substantially conical needle thereon for regulating fluid flow through the orifice, thread means on the stem intermediate its ends and engaged with the housing, and an end portion of the stem projecting from the housing and adapted for rotation to move the needle axially into and out of fluid sealing engagement with the orifice, the improvement which includes a generally cylindrical surface at one end of the housing and surrounding the point of emergence of the end portion of the stem from the housing, an impervious operating cap mounted on the end portion of the stem and having a counterbore therein within which the said cylindrical portion of the housing is snugly received, a sealing member surrounding the stem between the thread means thereon and the fluid outlet means and establishing a leak proof relationship between the housing and the stem, thereby, in cooperation with the cap, to prevent fluid and foreign matter from interfering with the efficient operation of the thread means, stop shoulder means in cooperation with the cylindrical portion and adapted for abutment with the edge of that portion of the cap within which the cylindrical portion is received, thereby to limit the travel of the stem and prevent over-tightening of the thread means and resultant scoring of the needle, and means for adjusting the position of the cap axially along the stem so that the travel thereof may be varied in order to compensate for wear on the needle.

8. In a valve device, a housing having a plurality of adjacent coaxially alinged bore sections, with each successive bore section being reduced in diameter with respect to the next adjacent bore section and being joined thereto by generally radially extending shoulder means, an annular seating lip formed by the intersection with a smaller diameter bore section of the shoulder means interconnecting the same with the next adjacent larger diameter bore section, an elongated stem reciprocally received within said larger diameter bore section and provided with a generally conical elongated slender needle member extending into and coaxially aligned with said smaller diameter bore section, and converging in the direction of the diametrical reduction of successive bore sections, a pair of conical surfaces joining said stem and said needle member for enhancing smooth flow, the diameter of the conical needle at its smallest value being less than the diameter of said smaller diameter bore section, and at its largest value being greater than the diameter of said smaller diameter bore section, a fluid outlet passageway intersecting said larger diameter bore section, means for establishing fluid conducting communication between said smaller diameter bore section and a fluid line, means for establishing fluid conducting communication between the outlet passageway and another fluid line, and relatively fine thread means mounting the stem within the housing for axially extending and retracting the stem whereby to move a portion of the needle member intermediate its ends into and out of substantially line contact fluid sealing engagement with the annular sealing lip, one end of the stem projecting beyond the valve housing and being provided with a dust-proof operating cap closely enveloping the portion of the housing through which the stem projects, the stem being further provided with a sealing member extending circumferentially therearound and located between the thread means and the fluid outlet passageway thereby, in cooperation with the dustproof cap, to completely isolate the thread means from foreign matter and fluid, and provide a braking means for said stem.

9. A device as defined in claim 8 in which the needle member and the annular seating lip are of diverse hardnesses.

10. A device as defined in claim 8 in which the tapered needle member is substantially harder than the annular seating lip.

11. A valve device comprising a housing having a plurality of cylindrical bores therein, one larger bore being of a greater diameter than the next adjacent smaller bore, the smaller and larger bores each communicating with a fluid line and further being in communication with each other when the valve is open, shoulder means joining said larger and smaller bores, an elongated slender conical stem means extending into said smaller bore past said shoulder and having a larger portion thereof adapted to seat on the junction of said smaller bore and shoulder means, finely threaded stem means integral with said elongated stem and being rotatably and reciprocally received in said housing with one end extending therefrom, an operating cap fixedly attached to said stem and extending circumferentially around an axially extending portion of said housing in snug fitting engagement therewith, a radially extending shoulder on said housing adapted to provide a stop shoulder for said operating cap to limit the movement of said stem in one direction, means on said stem for limiting the movement thereof in an opposite direction, and seal means adjacent the juncture of said elongated stem means and said threaded stem means, said last mentioned juncture being in close proximity to said shoulder to minimize the dead space of said valve.

References Cited in the file of this patent

UNITED STATES PATENTS

| | | |
|---|---|---|
| 1,912,994 | Oishei | June 6, 1933 |
| 1,980,752 | Eskilson | Nov. 13, 1934 |
| 2,209,709 | Weatherhead | July 30, 1940 |
| 2,935,292 | Williamson | May 3, 1960 |

FOREIGN PATENTS

| | | |
|---|---|---|
| 528,596 | Belgium | May 31, 1954 |
| 1,034,939 | Germany | July 24, 1958 |